United States Patent
Kiefel et al.

(10) Patent No.: US 7,165,822 B2
(45) Date of Patent: Jan. 23, 2007

(54) FIRE PROTECTION CABINET ASSEMBLY

(75) Inventors: Achim Kiefel, Derschen (DE); Thorsten Weller, Weitefeld (DE); Uwe Sabrowski, Dreieich (DE)

(73) Assignee: Lampertz GmbH & Co. KG, Wallmenroth (DE)

( * ) Notice: Subject to any disclaimer, the term of this patent is extended or adjusted under 35 U.S.C. 154(b) by 260 days.

(21) Appl. No.: 10/472,016

(22) PCT Filed: Mar. 20, 2002

(86) PCT No.: PCT/EP02/03112

§ 371 (c)(1),
(2), (4) Date: May 21, 2004

(87) PCT Pub. No.: WO02/075882

PCT Pub. Date: Sep. 26, 2002

(65) Prior Publication Data

US 2004/0195946 A1 Oct. 7, 2004

(30) Foreign Application Priority Data

Mar. 20, 2001 (DE) ............................... 101 13 625

(51) Int. Cl.
*A47B 96/00* (2006.01)
(52) U.S. Cl. .................................... 312/409
(58) Field of Classification Search ................ 312/409, 312/257.1, 400; 220/592.1, 592.05, 592.09
See application file for complete search history.

(56) References Cited

U.S. PATENT DOCUMENTS 1,207,066 A * 12/1916 Millice ....................... 312/240
1,241,615 A * 10/1917 Farrow ......................... 109/23
4,413,869 A * 11/1983 Pichler et al. ............... 312/236
6,158,833 A * 12/2000 Engler ......................... 312/409

FOREIGN PATENT DOCUMENTS

| DE | 33 44 598 C1 | 9/1984 |
| DE | 198 55 931 A1 | 6/2000 |
| WO | 02/075882 A1 | 9/2002 |

* cited by examiner

*Primary Examiner*—James O. Hansen
(74) *Attorney, Agent, or Firm*—Pauley Petersen & Erickson

(57) ABSTRACT

A fire protection cabinet assembly having a number of lined up fire protection cabinets. The fire protection cabinets are provided, in the form of fireproof wall elements, with a front door, a ceiling element, a floor element, a rear wall or a rear door and with at least one frame. The frame surrounds the front door and, optionally, the rear door and the frame has frame elements that are at least vertical. The fire protection cabinets that form the lateral termination are provided, on their free lateral exteriors, with lateral walls that are fireproof as well, and a seal is arranged in the area of abutting surfaces of the lined up fire protection cabinets. This invention accomplishes, during a fire, a reliable sealing even between the abutting locations. Thus, the fireproof seal includes sealing sets, which are arranged on the periphery between the abutting surface, and include, on the interior, fireproof sealing modules, which have fire protection material, which rest against the abutting locations and which laterally project beyond the abutting locations. A coupling is used to join the sealing modules to the adjacent wall elements on both sides of the abutting locations.

18 Claims, 1 Drawing Sheet

FIRE PROTECTION CABINET ASSEMBLY

BACKGROUND OF THE INVENTION

1. Field of the Invention

This invention relates to a fire protection cabinet assembly, having a plurality of fire protection cabinets lined up with one another, which have, as fireproof wall elements, a front door, a ceiling element, a floor element, a rear wall or rear door. At last one frame extends around the front door and optionally around the rear door, the frame has at least vertical frame elements, and the fire protection cabinets forming the lateral termination have fireproof side walls on their free lateral outsides. A seal extends all the way around in the region of abutting surfaces of the fire protection cabinets lined up with one another.

2. Discussion of Related Art

A fire protection cabinet assembly is disclosed in German Patent Reference DE 198 55 931 A1. The individual fire protection cabinets, lined up with one another, have fireproof wall elements, with layered fireproof material disposed between an outer sheet-metal lining and an inner sheet-metal lining. In the event of a fire the material counteracts excessive heat development in the interior of the cabinet for a length of time prescribed by a standard, so that particularly electronic devices in the cabinet remain unharmed. Abutting places between the wall elements, such as side elements, frame elements adjoining them, a floor element and a ceiling element, are sealed off with sealing elements, which are high-temperature-proof to protect against fire. There is no sealing between cabinets lined up with one another.

German Patent Reference DE 3344 598 C1 describes the introduction, of sealing elements, for instance H-shaped, on abutting frame legs between lined-up switch cabinets, but the cabinets are not fire protection cabinets.

SUMMARY OF THE INVENTION

One object of this invention is to provide a fire protection cabinet assembly of the type defined above but which, particularly at the abutting surfaces of the lined-up protection cabinets as well, assures high protection against fire.

This object is attained with characteristics discussed in the claims and in this specification. The fireproofing sealing has sealing sets which extend all the way around between the abutting surfaces, and fireproof sealing modules have fireproof material, which are placed on the abutting places on the inside and protrude laterally beyond them and are connected on both sides of the abutting places to the adjoining wall elements by coupling means.

Thus, a reliable fireproofing seal is assured, particularly at the abutting places of the lined-up protection cabinets.

With a simple structure, a reliable heat shield is assured because the wall elements are each embodied as a cassette, with an inner sheet-metal lining and an outer sheet-metal lining and at least one layer of fireproof material received between them.

Both for inserting the side walls and for inserting the front and rear doors or rear wall, simple, easily sealed transitions can be formed with the vertical frame elements having an angular cross section and being connected to one another at their legs associated with the side walls by connecting means. Particularly in the region of doors, but if desired also in the region of the side walls, the frame can have lower and/or upper horizontal frame elements. The connecting means, such as a continuous threaded rod with screws screwed laterally onto it, in the region of the legs of the angular frame elements produces a stable, clamping connection which withstands even strong forces upon heat development.

A simple, stable connection of the wall elements to one another and also of the sealing modules to the wall elements in the region of the abutting places is achieved with parts of espagnolette locks inserted into the abutting surfaces, oriented toward the side walls, of the vertical corner elements and/or of the floor elements and ceiling elements. The parts are brought or can be brought into engagement with further parts of espagnolette locks that for bracing with inserted side walls or the sealing modules placed on the abutting surfaces are brought or can be brought into engagement with further parts of the espagnolette locks that are inserted into the sealing modules at opposed points. Sealing sets are also disposed between the abutting surfaces of the vertical corner elements, of the ceiling elements, and of the floor elements and the adjoining faces of the side walls. There is thus a dual use of the espagnolette locks.

If the sealing sets have a fireproof seal, which inflates upon heat development, and a moisture seal toward the outside of the switch cabinet assembly, then near the abutting surfaces as well, a fireproofing seal is attained, by which both fire gases and moisture are prevented from entering the interior.

Simple assembly is promoted with the sealing modules having an outer sheet-metal lining of C-shaped cross section, and from a base surface, disposed toward the interior of the switch cabinet assembly. Lateral legs are canted at a right angle and from them, flangelike end legs, oriented toward one another with their free ends, are bent at a right angle. At least one layer of fireproof material is disposed in the interior of the sheet-metal lining. The sealing modules can be produced easily and mounted at the abutting places of the protection cabinet.

The vertical corner elements, at least in the region of their longitudinal edges oriented toward the side walls, and the floor elements and the ceiling elements, at least in the region of their side edges adjoining one another, are provided, in the direction of thickness of these wall elements, with a shoulder that accommodates lining up, U-shaped rooms that are formed. At least one layer of fireproof material is placed in the U-shaped rooms, and not only is there a simple, unambiguous disposition of side wall elements, ceiling elements, floor elements, and optionally rear wall elements, but the U-shaped room produced upon lining up is also securely sealed off.

Reliable fire protection is promoted because the wall elements, from the outside inward, have a first layer of a first fireproof material, a second layer of a second fireproof material, and a third layer of a third fireproof material. Because the sealing module, from the outside inward in their interior with respect to the cabinet assembly, have at least one layer of the second fireproof material and a further layer of the third fireproof material, the individual layers can be adapted to one another for heat shielding. For predetermined heat shielding, the least possible wall thickness is possible because of simple assembly and occupying the least possible amount of space.

Reliable sealing is promoted with the layer placed in the U-shaped rooms including the first fireproof material. Between the layer put in place and the adjacent surface of the wall elements, fireproof seals that inflate in response to thermal action are placed over a length of the surface and at least intermittently in cross section over the surface.

If the abutting surfaces adjoining one another of the floor elements and ceiling elements have vertically upward- and vertically downward-oriented free end portions, then the floor elements and ceiling elements can also be joined together in a simple way at the end portions. With the side walls or rear walls inserted, the end portions serve to fix them. The layer placed in the U-shaped rooms is cut away in the region of the end portions.

BRIEF DESCRIPTION OF THE DRAWINGS

This invention is described in further detail in view of an exemplary embodiment shown in the drawings, wherein.

DESCRIPTION OF PREFERRED EMBODIMENTS

Figure 1:
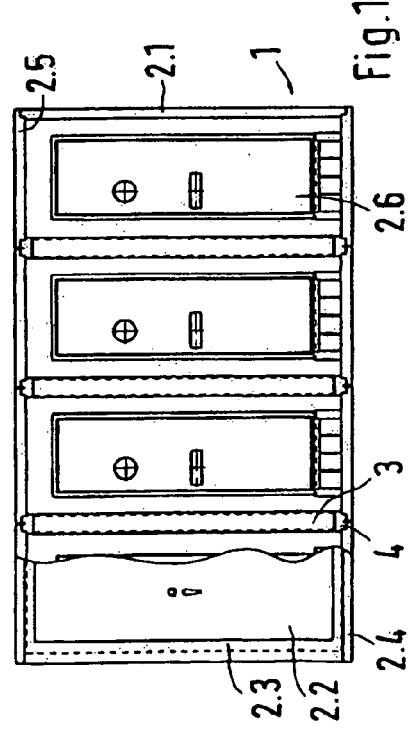
FIG. 1 is a partly cut away front view of a fire protection cabinet assembly.

FIG. 1 shows a fire protection cabinet assembly 1, with protection cabinets 2 lined up with one another. The protection cabinets 2 each have one front door 2.2, vertical frame elements 2.3, one floor element 2.4, one ceiling element 2.5, and one rear wall or rear door 2.6. The two protection cabinets 2 that form the lateral termination have on the outside of the cabinet assembly side walls 2.1, which as seen from the cabinet on the right in FIG. 1 are shouldered across their thickness at the edge at the top and bottom and also across their thickness at vertical edges (not shown) and are inserted into shoulders, adapted thereto at the edges of the associated floor element 2.4, ceiling element 2.5, and vertical frame elements 2.3. In the region of or near the abutting places of the lined-up cabinets, vertical sealing modules 3 and horizontal sealing modules 4 are provided, to assure reliable sealing off of the abutting places in the event of a fire.

Figure 2:
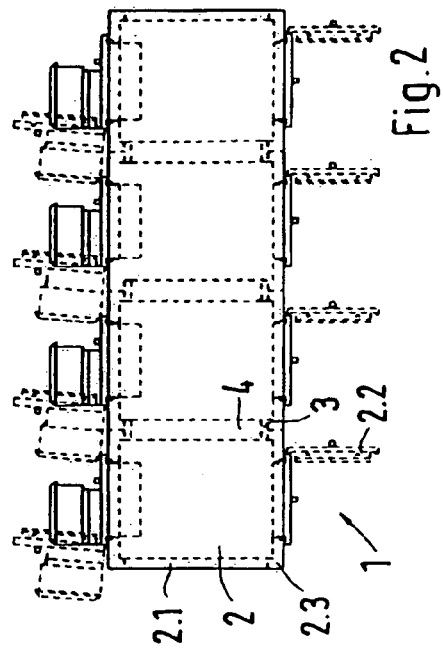
FIG. 2 is a top view of the fire protection cabinet assembly.
Figure 4:
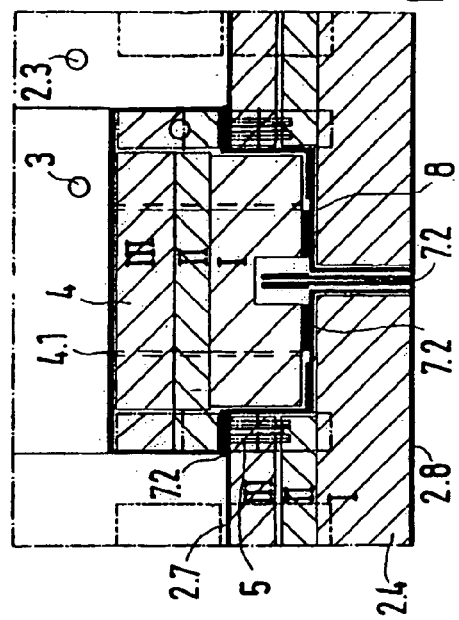
FIG. 4 is a cross section of a detail of the cabinet assembly in the region of abutting floor elements.
Figure 3:
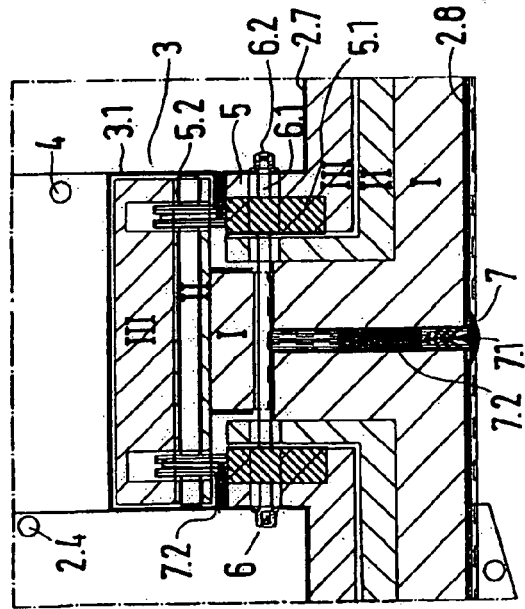
FIG. 3 is a cross section of a detail of the cabinet assembly in the region of an abutting surface of vertical corner elements.

The wall elements, including the side wall 2.1, front door 2.2, frame elements 2.3, floor element 2.4, ceiling element 2.5, and rear wall or rear door 2.6, have an inner sheet-metal lining, oriented toward the switch cabinet interior, and on their outside an outer sheet-metal lining 2.8, and between them they receive, for example, three layers I, II, III, as shown in FIGS. 3 and 4, of fireproof material adapted to one another, which material, even if the structure of the walls is relatively thin, assures reliable heat shielding to meet a standard for a prescribed length of time. The vertical frame elements 2.3 are embodied as corner elements and have an angular or L-shaped cross section, as shown in FIGS. 2 and 3. For fixation of the side walls 2.1, inserted between the frame elements 2.3, floor element 2.4 and ceiling element 2.5, parts 5.1 and 5.2 of espagnolette locks 5 are inserted into the abutting surfaces oriented toward one another, specifically in the shoulder region located toward the interior of the protection cabinet. With these parts, simple and fast bracing is attained, as described in further detail in German Patent Reference DE 198 55 931 A1.

Corresponding parts 5.2 of the espagnolette locks 5 are also disposed at appropriate positions in the vertical and horizontal sealing modules 3, 4, so that the vertical and horizontal sealing modules 3, 4, by utilizing the espagnolette locks, can be firmly fastened simply and stably along the abutting surfaces, fitting over these surfaces on the inside of the switch cabinet assembly, as shown in FIGS. 3 and 4. The sealing modules 3, 4 have a width equivalent to twice the thickness of the side walls 2.1, for instance, including the gap filled up with a sealing set 7 between the abutting surfaces of the lined-up cabinets, so that they rest approximately flush with the inner linings 2.7 of the frame elements 2.3 or with an imaginary placement line of the side walls 2.1 on the floor element 2.4 and ceiling element 2.5, and produce a good, unobtrusive fireproofing seal.

The sealing sets 7 are inserted between the abutting surfaces of the lined-up protection cabinets 2. At least between the vertical and the upper abutting surfaces, extending in the direction of the depth, the sealing sets 7 have elastic sealing elements 7.1, toward the outside, with sealing portions resting on both sides of the outer lining 2.8, and also have fireproof seals 7.2 further inward, which inflate upon the development of heat and assure secure sealing off against fire gases, even in the event that the wall elements warp. As FIG. 4 shows, sealing elements 7.1 that form a moisture protection may be absent on the underside. In the region of or near the lateral legs of the L-shaped frame elements 2.3, connecting means 6 are also inserted, for instance in the form of continuous threaded rods 6.1. Free ends which protrude beyond the inner linings 2.7 on both sides, have nuts 6.2 screwed on to provide bracing.

As FIG. 4 shows, the vertical abutting surfaces of the floor elements 2.4 and ceiling elements 2.5 are lengthened, oriented toward one another, across the thickness of the outer shoulder region and form U-like receptacles for insertion of the side walls 2.1. The lengthened end portions can also be used for additionally connecting the lined-up protection cabinets 2 in the floor and ceiling regions.

The vertical sealing modules 3 and the horizontal sealing modules 4 have sheet-metal linings 3.1 bent into a C-shaped cross section, in the interior of which, viewed from the outside of the switch cabinet assembly 1, a layer II and a layer III of corresponding fireproof materials to the layers II and III of the wall elements are disposed. One further layer I of the corresponding fireproof material to that in the wall elements is also inserted, as FIGS. 3 and 4 show, into the U-shaped space 8 created by the shoulders when the protection cabinets 2 are lined up with one another. Further fireproof seals 7.2 that inflate upon the development of heat are inserted between the flangelike end portions, oriented toward one another, of the end portions of C-shaped cross section of the respective sheet-metal linings 3.1 and 4.1 and the adjacent peripheral regions of the frame elements 2.3 and floor elements 2.4 and ceiling elements 2.5. The fireproof seals 7.2 are placed in the U-shaped space 8 between the emplaced layer I of fireproof material and the adjoining surfaces of the wall elements, so that near this region as well, Wheat develops, secure sealing against the entry of fire gases is assured.

The invention claimed is:

1. A fire protection cabinet assembly (1) having a plurality of fire protection cabinets (2) lined up with one another, which have as fireproof wall elements, a front door (2.2), a ceiling element (2.5), a floor element (2.4), a rear wall (2.6) or rear door, and at last one frame extending around one of the front door (2.2) and the rear door, the frame having vertical frame elements (2.3), and the fire protection cabinets (2) having fireproof side walls (2.1) on free lateral outsides of the cabinet assembly, and a fireproofing seal extending all the way around and disposed near abutting surfaces of the fire protection cabinets (2) lined up with one another, the fire protection cabinet assembly (1) comprising:

the fireproofing seal having a plurality of sealing sets (7) extending between the abutting surfaces, and fireproof sealing modules (3, 4) with fireproof material, which are placed on the abutting surfaces on an inside and which protrude laterally beyond and connect to adjoining wall elements by a coupling (5).

2. The assembly of claim 1, wherein each of the fireproof wall elements is embodied as a cassette with an inner sheet-metal lining (2.7) and an outer sheet-metal lining (2.8) and at least one layer (I, II, III) of fireproof material received between the inner sheet-metal lining (2.7) and the outer sheet-metal lining (2.8).

3. The assembly of claim 2, wherein the vertical frame elements (2.3) have an angular cross section and are connected to one another at legs associated with the side walls (2.1) by a connector (6).

4. The assembly of claim 3, comprising espagnolette locks (5), wherein parts (5.1) of the espagnolette locks are inserted into the abutting surfaces, oriented toward the side walls (2.1), of at least one of vertical frame elements (2.3) and the floor elements (2.4) and ceiling elements (2.5), which parts are engageable with further parts (5.2) of the espagnolette locks that for bracing with one of the inserted side walls (2.1) and the sealing modules (3, 4) placed on the abutting surfaces are engageable with the further parts (5.2) of the espagnolette locks that are inserted into the sealing modules at opposed points; and the sealing sets (7) are disposed between the abutting surfaces between the vertical frame elements (2.3), the ceiling elements (2.5), and the floor elements (2.4) and the adjoining faces of the side walls (2.1).

5. The assembly of claim 4, wherein the sealing sets (7) have a fireproof seal (7.2) which inflates when heat develops and a moisture seal (7.1) toward an outside of the fire protection cabinet assembly (1).

6. The assembly of claim 5, wherein the sealing modules (3, 4) have an outer sheet-metal lining (3.1, 4.1) of C-shaped cross section having a base surface disposed toward the interior of the fire protection cabinet assembly (1), and lateral legs canted at a right angle from the base section and forming end legs bent at a right angle and oriented toward one another at free ends opposite the base section; and at least one layer (I, II, III) of fireproof material is disposed in the interior of the sheet-metal lining (3.1, 4.1).

7. The assembly of claim 6, wherein the vertical frame elements (2.3), at least near their longitudinal edges oriented toward the side walls (2.1), and the floor elements (2.4) and the ceiling elements (2.5), at least near their side edges adjoining one another, are provided with a shoulder so that in lining up, U-shaped spacings are formed; and at least one layer (I) of the fireproof material is placed in each of the U-shaped spacings.

8. The assembly of claim 7, wherein the layer (1) placed in each of the U-shaped spacings comprises the first fireproof material; and between the layer (I) and the adjacent surface of element, a fireproof seal (7.2) that inflates in response to a thermal action is placed over a length of the surface and at least intermittently in cross section over the surface.

9. The assembly of claim 7, wherein each of the wall elements, from the outside inward, have a first layer (I) of a first fireproof material, a second layer (II) of a second fireproof material, and a third layer (III) of a third fireproof material; and the sealing module (3, 4), from the outside inward in their interior with respect to the cabinet assembly (1), have at least one layer (II) of the second fireproof material and a further layer (III) of the third fireproof material.

10. The assembly of claim 9, wherein the layer (I) placed in each of the U-shaped spacings comprises the first fireproof material; and between the layer (I) and the adjacent surface of an adjacent wall element, a fireproof seal (7.2) that inflates in response to a thermal action is placed over a length of the surface and at least intermittently in cross section over the surface.

11. The assembly of claim 10, wherein the abutting surfaces adjoining one another of the floor elements (2.4) and the ceiling elements (2.5) have vertically upward- and vertically downward-oriented free end portions.

12. The assembly of claim 6, wherein each of the wall elements, from the outside inward, have a first layer (I) of a first fireproof material, a second layer (II) of a second fireproof material, and a third layer (III) of a third fireproof material; and the sealing module (3, 4), from the outside inward in their interior with respect to the cabinet assembly (1), have at least one layer (II) of the second fireproof material and a further layer (III) of the third fireproof material.

13. The assembly of claim 1, wherein the vertical frame elements (2.3) have an angular cross section and are connected to one another at legs associated with the side walls (2.1) by a connector (6).

14. The assembly of claim 1, comprising espagnolette locks (5), wherein parts (5.1) of the espagnolette locks are inserted into the abutting surfaces, oriented toward the side walls (2.1), of at least one of the vertical frame elements (2.3) and the floor elements (2.4) and ceiling elements (2.5), which parts are engageable with further parts (5.2) of the espagnolette locks that for bracing with one of the inserted side walls (2.1) and the sealing modules (3, 4) placed on the abutting surfaces are engageable with the further parts (5.2) of the espagnolette locks that are inserted into the sealing modules at opposed points; and the sealing sets (7) are disposed between the abutting surfaces between the vertical frame elements (2.3), the ceiling elements (2.5), and the floor elements (2.4) and the adjoining faces of the side walls (2.1).

15. The assembly of claim 1, wherein the sealing sets (7) have a fireproof seal (7.2) which inflates when heat develops and a moisture seal (7.1) toward an outside of the fire protection cabinet assembly (1).

16. The assembly of claim 1, wherein the sealing modules (3, 4) have an outer sheet-metal lining (3.1, 4.1) of C-shaped cross section having a base surface disposed toward an interior of the fire protection cabinet assembly (1), and lateral legs canted at a right angle from the base section and forming end legs bent at a right angle and oriented toward one another at free ends opposite the base section; and at least one layer (I, II, III) of fireproof material is disposed in the interior of the sheet-metal lining (3.1, 4.1).

17. The assembly of claim 1, wherein the vertical frame elements (2.3), at least near their longitudinal edges oriented toward the side walls (2.1), and the floor elements (2.4) and the ceiling elements (2.5), at least near their side edges adjoining one another, are provided, with a shoulder so that in lining up, U-shaped spacings are formed; and at least one layer (I) of the fireproof material is placed in the U-shaped spacings.

18. The assembly of claim 1, wherein the abutting surfaces adjoining one another of the floor elements (2.4) and ceiling elements (2.5) have vertically upward- and vertically downward-oriented free end portions.

* * * * *

UNITED STATES PATENT AND TRADEMARK OFFICE
CERTIFICATE OF CORRECTION

| | | |
|---|---|---|
| PATENT NO. | : 7,165,822 B2 | Page 1 of 1 |
| APPLICATION NO. | : 10/472016 | |
| DATED | : January 23, 2007 | |
| INVENTOR(S) | : Achim Kiefel et al. | |

It is certified that error appears in the above-identified patent and that said Letters Patent is hereby corrected as shown below:

On the Title Page, in the inventors section (75):
    change the residence of inventor Thorsten Weller from "Weitefeld" to --Bad Marienberg--;
    change the residence of inventor Uwe Sabrowski from "Dreieich" to --Rheda-Wiedenbrück--.

Signed and Sealed this

Fifteenth Day of May, 2007

JON W. DUDAS
*Director of the United States Patent and Trademark Office*